United States Patent Office 3,071,533
Patented Jan. 1, 1963

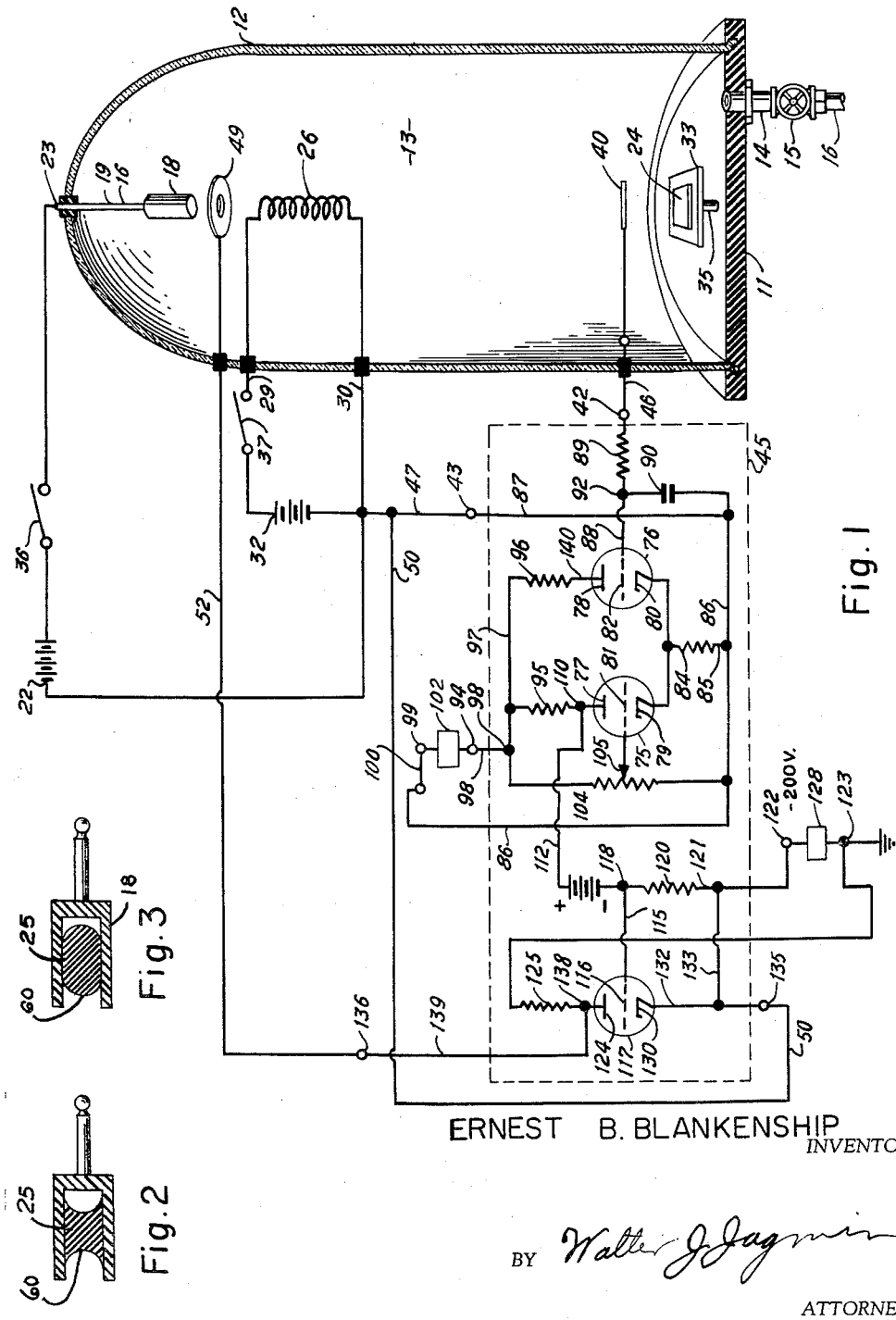

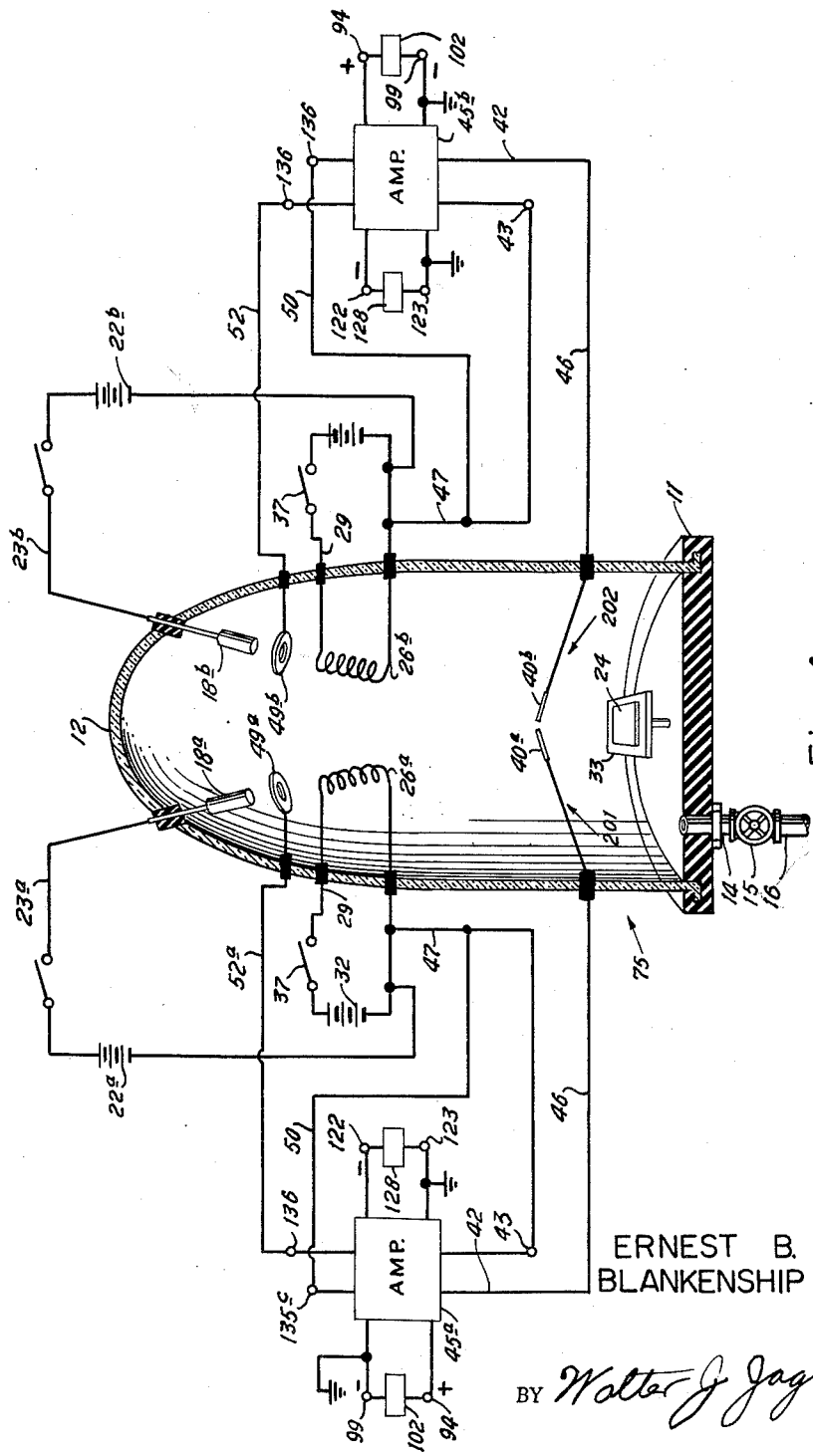

3,071,533
DEPOSITION CONTROL MEANS
Ernest Bayne Blankenship, Irving, Tex., assignor to
Varo Mfg. Co., Inc.
Filed Sept. 11, 1958, Ser. No. 760,492
7 Claims. (Cl. 204—298)

This invention relates to apparatus for evaporating substances and more particularly to apparatus for evaporating substances at controlled rates by electron bombardment.

An object of this invention is to provide a new and improved apparatus for evaporating substances.

Another object of the invention is to provide a new and improved apparatus for evaporating substances and depositing the resultant evaporant on a predetermined surface.

Still another object of the invention is to provide an apparatus, of the type described above, having means for controlling the rate of evaporation to obtain a homogeneous coating on the surface on which the evaporant is deposited.

A further object of the invention is to provide a new and improved apparatus having means for vaporizing a substance in a vacuum by means of direct electron bombardment and having means for varying the rate of electron bombardment of the substance to control the rate of evaporation of the substance.

A still further object of the invention is to provide an apparatus having a means for producing electrons to bombard a substance with electrons and having means interposed between the substance and the means for producing electrons for regulating the flow of electrons to the body of coating substance.

A still further object is to provide an apparatus, of the type described above, wherein the means for varying the rate of flow of electrons to the substance is responsive to the rate of evaporation of the substance whereby a preselected rate of evaporation may be held substantially constant.

Another object of the invention is to provide a apparatus, of the type described above, for depositing a homogeneous layer of the evaporated substance on a surface by maintaining constant the rate of evaporation of the substances.

Still another object of the invention is to provide an apparatus for depositing a homogeneous layer of evaporant on an article by controlling the rate of evaporation of the substance producing the evaporant.

A further object of the invention is to provide a new and improved apparatus for depositing a homogeneous layer of substance on a surface by evaporating the substance at a uniform rate and causing the evaporant to impinge on the surface.

A still further object of the invention is to provide a new and improved apparatus for producing a homogeneous substance from a plurality of constituent substances by simultaneously evaporating the constituent substances at preselected rates and causing the evaporants to impinge simultaneously upon a preselected surface whereby the resultant substance deposited on such surface is homogeneous and composed of the predetermined proportions of the constituent substances.

A still further object is to provide an apparatus, of the type described above, where the rates of evaporation of individual constituent substances may be preselected.

Still another object of the invention is to provide an apparatus of the type described above wherein the rates of evaporation of the constituent substances are maintained at constant preselected values.

For better understanding of the invention reference may be had to the following description taken in connection with the accompanying drawing and its scope will be pointed out in the appended claims.

In the drawing,

FIGURE 1 is a semi-diagrammatic view of an apparatus embodying the invention.

FIGURE 2 is an enlarged fragmentary sectional view of the device for holding the substance in position to be subjected by electron bombardment showing a substance therein whose surface tension and wettability relative to the retaining surfaces of the holder are such that a concave meniscus is formed at the ends thereof when the substance is liquefied.

FIGURE 3 is a view similar to FIGURE 2 showing a substance whose surface tension and wettability relative to the retiring surfaces of the holding device are such that it forms a concave meniscus when in a liquid condition in the holding device, and, FIGURE 4 is a semi-diagrammatic view of an apparatus embodying the invention simultaneously evaporating two constituent substances.

Referring now particularly to FIGURE 1 of the drawing, the apparatus 10 for evaporating a coating substance and depositing the evaporate upon an article includes a base 11 of nonconductive material upon which is disposed in a seal tight relation an inverted preferably transparent jar or container 12 which together with the base forms a vacuum compartment or chamber 13 which may be connected to a suitable pump.

A holding device 18 is supported adjacent the top of the jar 12 by means of a post 19 rigidly secured to the bell jar. The holding device is preferably tubular in shape having a closed upper end to which the post 19 is secured. The tubular holding device 18 is connected to the positive side of the source of electrical energy 22 by means of a conductor 23 which extends through a hermetically sealed aperture in the jar to the holding device 18.

The substance 25 to be evaporated and deposited on the article 24 is inserted in the tubular holding device 18. The open lower end of the holding device 18 is disposed over a filament 26 which is connected to the other or negative side of the source of electrical energy 22 whereby electrons generated or produced by the filament 26 are projected on to the lower end of the body 25 to heat it and thus cause it to evaporate. The filament 26 has its opposite ends connected via conductors 29 and 30 to opposite sides of the source of electrical energy 32. The conductors extend through suitable sealed apertures in the jar 12.

The article 24 on which the evaporated substance is to be deposited is disposed on a support 33 which is mounted on the base 11 by means of a post or standard 35.

It will now be apparent that the switches 36 and 37 in the conductors 23 and 29 are closed, after the container 13 has been evacuated to the desired necessary degree, to permit the establishment of a steady flow of electrons from the filament cathode 26 to the substance 25 to be evaporated and deposited on the article 24. The substance 25 is thus bombarded with electrons and its temperature is raised above the critical temperature of evaporation. As a result the substance 25 evaporates and the evaporate impinges on the article 24 and is deposited thereon.

It is found that the rate with which the substance 25 evaporates varies even though an effort is made to keep all conditions uniform. Variations in the voltage of the sources 22 and 32, the degree of vacuum in the chamber 13, variations in the surface of the substance 25 exposed to the electron bombardment and its distance from the cathode filament 26, and perhaps other factors cause such variations in the rate of evaporation. Variations in the rate of evaporation of the substance 25 and therefore variations in the rate of deposition of the evaporated substance on the article 24, result in the lack of homogeneity in the deposit due perhaps to the action of whatever extraneous gasses are present in the chamber 13, to differences in the molecular form of the substance deposited on the article 24 or to other causes which are as yet unknown.

In order to cause the rate of evaporation, and therefore the rate of deposition of the substance on the article 24, to remain uniform or constant, a sensing element or probe 40 is disposed between the cathode filament 26 and the article 24 to measure or detect the potential difference between the probe 40 and the cathode filament 26, which potential difference is a measure of the ion content of the vapor beam extending from the body 25 to the target 24. The greater the rate of evaporation, of course, the greater will be the density of the vapor beam and the greater its ion content. This potential is impressed across the input terminals 42 and 43 of any suitable amplifier 45 through conductors 26 and 47 respectively, the conductor 45 extending through a suitable sealed aperture in the jar 12 into the chamber 13. The output of the amplifier is impressed across the filament cathode 26 and an annular control member 49, which is disposed between the cathode filament 26 and the substance 25, by means of the conductors 50 and 47 and the conductor 52 which extends through a suitable sealed aperture in the bell jar 12 into the chamber 13.

The vapor generated by the evaporation of the substance of the body 25 flows in a beam through the central aperture of the annular control member 49 and through the filament cathode 26 which is arranged in a helical coil in order to cause the vapor to be ionized to a greater degree as it flows through the electrons being emitted by the cathode and accelerated toward the body 25. As a result, a portion of the vapor is ionized and causes a potential to exist between the probe or detector 40 and the filament 26. This potential will vary directly in accordance with the rate of evaporation of the substance of the body 25. For example, if it is the desire to maintain the rate of evaporation, and therefore the rate of deposition, at a predetermined constant value and if the substance 25 is a metal whereby its vapor in passing through the stream of electrons emitted by the filament cathode 26 is partially ionized to assume a positive charge, then if the rate of evaporation from the body 25 tends to increase, a more positive charge is created on the detector 40 by the stream or beam of vapor in its travel from its body 25 to the target or article 24 and the potential across the cathode filament 26 and the detector 40 is increased. This change in the potential across the filament cathode 26 and the detector 40 is amplified by the amplifier 45 which causes the control member to become more negative or less positive, as the case may be, whereby the rate of flow of electrons from the filament cathode 26 to the body 25 is decreased. As a result, the rate of evaporation of the substance of the body 25 is decreased accordingly. In the event that the rate of evaporation tends to decrease, the positive charge on the detector 40 decreases accordingly and the potential across the filament cathode 26 and the detector 40 decreases accordingly. As a result the control member 49 becomes more positive or less negative, as the case may be, relative to the filament cathode 26 and the rate of flow of electrons from the filament cathode 26 to the substance of the body 25 increases whereby the rate of evaporation of the substance is increased. In this manner the rate of evaporation of the substance 25, and therefore the rate of deposition of the substance 25 on the target or article 24 is maintained substantially uniform or constant.

The amplifier 45 may be of any suitable type and may comprise a pair of electrical discharge means 75 and 76 having anodes 77 and 78, cathodes 79 and 80 and control members 81 and 82, respectively. The cathodes 79 and 80 are connected to the input terminal 43 through a resistance 84 and conductors 85, 86 and 87. The control grid or member 82 of the electric discharge means 76 is connected to the input terminal 42 through a conductor 88 and a resistance 89. A capacitor 90 is connected between the common juncture 92 of the control member 82 and the resistance 89 and the conductor 86 whereby the capacitor 90 is connected in series with the resistance 84 across the control member 82 and the cathode 80 of the electric discharge means 76. The anodes 77 and 78 are connected to a power input terminal 94 of the amplifier through resistances 95 and 96 and conductors 97 and 98. The power input terminal 99 is connected by means of conductors 100 and 86 to the cathodes 79 and 80 the resistance 84, a suitable source of direct current 102 may be connected across the power input terminals 94 and 99 whereby the anode and cathode circuits of the electric discharge means 75 and 76 are energized by direct current. A potentiometer 104 is connected across the conductors 97 and 86 and is provided with a movable contact 105 which is connected to the control member 81 of the electric discharge means 75 whereby the bias potential impressed on the control member 81 may be varied by movement of the movable contact 105.

The common juncture 110 of the resistance 95 and the anode 77 of the electric discharge means 75 is connected through a conductor 112, a battery or source of direct current 113 and conductors 114 and 115 to the control member 116 of a control electric discharge means 117. The battery 113 is so connected between the conductors 112 and 114 as to impress a negative potential upon the control member 116. The common juncture 118 of the battery 113 and control member 116 is connected through a resistance 120 to the power input terminal 122 while the anode 124 of the electric discharge means 117 is connected through a resistance 125 and conductor 126 to the other power input terminal 123. A suitable source of direct current 128 is connected across the power input terminals 122 and 123 of the amplifier 45 in such manner that a negative potential is impressed upon the input terminal 122. The cathode 130 of the control electric discharge means 117 is connected to the power input terminal 122 through conductors 132, 133 and 121. The output terminals 135 and 136 of the amplifier are connected to the cathode 130 by the conductor 132 and to the common juncture 138 of the resistance 125 and anode 124 by means of a conductor 139.

It will now be apparent that if the potential across the input terminals 42 and 43 tends to increase, a more positive potential is impressed on the control grid 82 of the electric discharge means 76 which thus is rendered more conductive. As a result the electric discharge means 75 is rendered less conductive, raising the potential of the common juncture 110 of the anode 77 and the resistance 95. As a result, the potential of the control member 116 of the electric discharge member 117, which is maintained at a negative potential by the source of current 128, is rendered less negative. The control electric discharge device is thus rendered more conductive causing the juncture 138 to become more negative. As a result, the potential impressed on the control means 49 is rendered more negative.

Conversely, if the potential across the input terminals 42 and 43 becomes less negative, the potential impressed on the control grid 82 of the electric discharge means 76 will become less positive and the electric discharge means 76 will become less conductive. As a result, the electric discharge 75 will become more conductive and the potential of the juncture 110 will become less positive thereby rendering the control 117 more negative whereby the control electric discharge means 117 will become less conductive and a more positive potential will be impressed upon the control member 49.

Thus it will be apparent that any tendency of the potential impressed across input terminals 42 and 43 to vary will be corrected by variations in the potential impressed on the control member 49 whereby the potential impressed across the input terminals 42 and 43 will be maintained substantially constant. Since the potential impressed across the input terminals 42 and 43 is the potential existing between the filament 26 and the detector or probe 40 the potential impressed across the filament 26 and the probe 40 will be maintained substantially constant thereby maintaining substantially constant the rate of evaporation of the substance in the holder 18 and thus also maintain constant the rate of deposition of the evaporated substance on the article or surface 24. The predetermined rate or degree of evaporation which is to be maintained constant may be set at any desired level by adjustment of the adjustable contact 105 on the potentiometer resistance 104. This causes the biasing potential across the control grid and cathode of the electric discharge means 75 to vary and thus permits selective setting of the potential normally impressed on the control grid 49 for a preselected rate of evaporation and of deposition.

It will be apparent that if the substance being evaporated in the apparatus is of such physical characteristics that a negative potential is impressed on the probe or detector 40, the conductor 112 may be connected to the common juncture or connection 140 of the resistance 96 and the anode 78 of the electric discharge means 76 whereby variations impressed across the input terminals 42 and 43 will result in such variations of the potential impressed on the control member 49 as to maintain substantially constant the rate of evaporation and of deposition of the substance.

It will be apparent that the lower surface 60 of the body 25 will assume either a concave meniscus as shown in FIGURE 2 or a convex meniscus as shown in FIGURE 3, depending upon the relative physical characteristics of the substance of the holder device 18. The holder device 18 may be made either of a conductive substance or insulating substance, provided that in the latter case the electrical connector 16 extends through the holder 18.

It will now be apparent that an apparatus has been illustrated and described for evaporating a substance and causing the resultant vapor to be deposited on an article or surface which includes a holder device for holding the substance and a means 26 for producing electrons when the body 25 and the means for producing electrons are connected to opposite sides of a source of electrical energy whereby the electrons bombard the substance 25 to raise its temperature to a value such that evaporation of the substance takes place.

It will also be apparent that a means for controlling the rate of evaporation of the substance has been provided which includes a control member 49 interposed between the body 25 and the filament cathode for impressing a potential across a control member and the filament cathode 26 which varies in accordance with the rate of evaporation of the substance 25.

It will also be apparent that the means for controlling the rate of evaporation of the substance 25 includes a detector means 40 interposed between the body 25 and the article on which the vaporized substance is to be deposited whose potential varies in accordance with the rate of evaporation of the substance 25.

It will also be apparent that the detector means 40 is operatively associated with the control member 49 through the amplifier means 45 whereby variations in the potential impressed upon the control member 49 control the amplifier means whereby the rate of evaporation of the substance of the body 25 is maintained substantially constant.

It will also be apparent that the detector means 40 is interposed between the filament 26 and the article 24 on which the evaporated substance is to be deposited whereby the potential across the filament cathode 26 and the detector means 40 varies in accordance with the variations of the rate of evaporation of the substance 25.

It will also be apparent that the control member 49 is annular in configuration having a central aperture through which the evaporated substance flows toward the article or surface on which the evaporate is to be deposited.

It will further be seen that the cathode 26 is in the form of a helical coil whose longitudinal axis is essentially coincident with the central axis of the annular control member 49 and of the longitudinal axis of the tubular holder device 18 whereby the beam of vapor emitted by the substance 25 passes through the filament cathode 26 to increase the degree of ionization of the vapor during its passage to the article 24 whereby the degree of variation of the potential across the filament cathode 26 and the detector 40 with variations in the rate of evaporation of the body 25 is increased in order to provide a maximum variation in the potential impressed across the input terminals 42 and 43 of the amplifier and thus increase the accuracy of regulation of the rate of evaporation of the substance 25.

In FIGURE 4 is illustrated an apparatus 75 for depositing two substances simultaneously upon the article 24 or any other surface in order to produce an alloy which is formed of two separate metals or two different alloys or to produce a substance formed of two different substances. This apparatus in essence merely duplicates the devices for evaporating and depositing substances shown in the apparatus 10 of FIGURE 1 and accordingly the components of the two devices or systems 201 and 202 are identified with the same reference numeral as like components of the device of FIGURE 1 to which the subscripts A and B have been added. The holding device 18A, the control member 49A, the cathode filament 26A, and the detector or probe 40A are aligned with respect to each other and at an angle to the holder 18B, control member 49B, cathode filament 26B, and control member or probe 40B which are also aligned with respect to each other so that the vapor beams produced by the evaporation of the substances in the holders 18A and 18B by the systems 80 and 81 impinge simultaneously on the article 24 and the resultant deposited substance is an alloy, composition or other substance formed of the two evaporated substances.

It will be apparent that the proportion of the two component substances evaporated in the holder by the systems 80 and 81 on to the article 24 may be maintained very precisely by the control members 49A and 49B in conjunction with the detectors 40A and 40B and associated amplifiers 45A and 45B. In the event that the article 24 is to be coated with an alloy which is to be formed of two metals, say copper and zinc in the proportion of three (3) parts of copper to one part of zinc, copper may be inserted into the holder 18A while zinc is inserted into the holder 18B. The gain of the amplifiers 45A and 45B is then adjusted by means of the movable contacts so that the rate of evaporation of the copper will be three times as great as the rate of evaporation of the zinc. As a result, the alloy which is deposited on the article 24 will be homogeneous throughout its thickness and will have copper and zinc in the very precise proportion of 3 to 1.

It will now be seen that a new and improved apparatus for producing alloys or other substances formed of two dissimilar substances has been illustrated and described which includes a pair of systems 201 and 202 each of which is provided with a means for evaporating one of two dissimilar substances and depositing them simultaneously upon the article which is to be coated with the resultant substance.

It will further be seen that each of the systems includes a means for maintaining the rate of evaporation of each of the dissimilar substances substantially constant whereby the resultant substance formed of the two dissimilar substances is homogeneous. It will further be seen that the rates of evaporation of the two dissimilar substances by the two systems 201 and 202 may be set in any desired proportion so that the resultant substance is composed of predetermined precise ratios of the two dissimilar substances.

It will be apparent to those skilled in the art that various changes and modifications may be made in the above illustrated and described device without departing from the spirit and scope of the invention and, therefore, the appended claims aim to cover all such changes and modifications as fall within the true spirit and scope of this invention.

What I claim as new and desire to secure by Letters Patent of the United States is:

1. A device for evaporating a substance at a controlled rate and depositing the evaporant on a surface comprising: means providing an evacuated chamber; a means for holding the substance in a position in the chamber; means for producing electrons in said evacuated chamber, said electron producing means and said holding means being adapted to be connected across a source of electrical energy whereby the electrons produced by said electron producing means are caused to bombard the substance held by said holding means; a control member interposed between said electron producing means and said holding means; and means responsive to the rate of evaporation of said substance for impressing a potential across said control member and said electron producing means which varies in accordance with the rate of evaporation of said substance to maintain substantially constant the rate of evaporation.

2. A device for evaporating a substance at a controlled rate and depositing the evaporant on a surface comprising: means providing an evacuated chamber; means for holding the substance in a position in the chamber; means for producing electrons in said evacuated chamber, said electron producing means and said holding means being adapted to be connected across a source of electrical energy whereby the electrons produced by said electron producing means are caused to bombard the substance held by said holding means; a control member interposed between said electron producing means and said holding means; and means responsive to the rate of evaporation of said substance for impressing a potential across said control member and said electron producing means which varies in accordance with the rate of evaporation of said substance to maintain substantially constant the rate of evaporation, said last mentioned means including detector means in said evacuated chamber exposed to the evaporated substance for producing a potential that varies in accordance with the rate of evaporation of said substance.

3. A device for evaporating a substance at a controlled rate and depositing the evaporant on a surface comprising: means providing an evacuated chamber; means for holding the substance in a position in the chamber; means for producing electrons in said evacuated chamber, said electron producing means and said holding means being adapted to be connected across a source of electrical energy whereby the electrons produced by said electron producing means are caused to bombard the substance held by said holding means; a control member interposed between said electron producing means and said holding means, and means responsive to the rate of evaporation of said substance for impressing a potential across said control member and said electron producing means which varies in accordance with the rate of evaporation of said substance for regulating the flow of the electrons from the electron producing means to the substance to maintain substantially constant the rate of evaporation, said last mentioned means including detector means in said evacuated chamber exposed to the evaporated substance for producing a potential that varies in accordance with the rate of evaporation of said substance, said means for producing electrons comprising a coil adapted to be connected across a source of electrical energy, said control member being in the form of an annulus having a central axis coincident with the longitudinal axis of the coil.

4. A device for evaporating a substance at a controlled rate and depositing the evaporate on a surface comprising: means providing an evacuated chamber; means for holding the substance in a position in the chamber; means for producing electrons in said evacuated chamber, said electron producing means and said holding means being adapted to be connected across a source of electrical energy whereby the electrons produced by said electron producing means are caused to bombard the substance held by said holding means; a control member interposed between said electron producing means and said holding means, and means responsive to the rate of evaporation of said substance for impressing a potential across said control member and said electron producing means which varies in accordance with the rate of evaporation of said substance for regulating the flow of the electrons from the electron producing means to the substance to maintain substantially constant the rate of evaporation, said last mentioned means including detector means in said evacuated chamber exposed to the evaporated substance for producing a potential that varies in accordance with the rate of evaporation of said substance, said means for producing electrons comprising a coil adapted to be connected across a source of electrical energy, said control member being in the form of an annulus having a central axis coincident with longitudinal axis of the coil, the evaporant from the substance flowing through the annulus and through the coil to impinge upon the surface, said detector means being interposed between said surface and said coil.

5. A device of the type described comprising: means providing a chamber which may be evacuated; a surface in the chamber and a plurality of means in said chamber for producing a homonegeous substance formed of a plurality of constituent substances by simultaneously evaporating the constituent substances at predetermined rates and causing their evaporants to impinge simultaneously upon and deposit on the surface the desired homogeneous substance thereon, each of said last mentioned means comprising means for bombarding each of the constituent substances with electrons; and means operably associated with each of said electron producing means and responsive to the rate of evaporation of the constituent substances for regulating the flow of electrons to the respective constituent substance to maintain substantially constant the rates of evaporation of the constituent substances.

6. A device of the type described comprising: means providing a chamber which may be evacuated; a plurality of means in said chamber for producing a homogeneous substance formed of a plurality of constituted substances by simultaneously evaporating the constituent substances and causing their evaporants to impinge simultaneously upon and deposit on a preselected surface to form a homogeneous deposit of the desired homogeneous substance thereon, each of said last mentioned means comprising means for bombarding each of the constituent substances with electrons; means operably associated with each of said electron producing means and responsive to the rate of evaporation of the constituent substances for regulating the flow of electrons to the respective constituent substances to maintain substantially constant the rates of evaporation of the constituent substances; and means operatively associated with said regulating means for individually adjusting the rates of evaporation of the constituent substances.

7. A device for evaporating a plurality of substances at individually controlled rates and depositing the evaporants on a surface to form a homogeneous substance comprising: means providing an evacuated chamber; a plurality of means for holding the substances in predetermined positions in the chamber; a plurality of means for producing electrons in said evacuated chamber, said electron producing means and said holding means being adapted to be connected across a source of electrical energy whereby electrons produced by each of said electron producing means are caused to bombard the substance held by an associated holding means; control members interposed between each of said electron producing means and said surface; and a plurality of means each responsive to the rate of evaporation of one of said substances for impressing a potential across each control member and its associated electron producing means which varies in accordance with the rate of evaporation of the associated substance to maintain substantially constant the rates of evaporation of said substances.

References Cited in the file of this patent

UNITED STATES PATENTS

| | | |
|---|---|---|
| 2,157,478 | Burkhardt et al. | May 9, 1939 |
| 2,527,747 | Lewis et al. | Oct. 31, 1950 |
| 2,630,780 | Falck | Mar. 10, 1953 |
| 2,754,259 | Robinson et al. | July 10, 1956 |
| 2,808,523 | Holmbeck | Oct. 1, 1957 |
| 2,816,239 | Berge | Dec. 10, 1957 |
| 2,899,372 | Hanlet | Aug. 11, 1959 |